Figure 1:
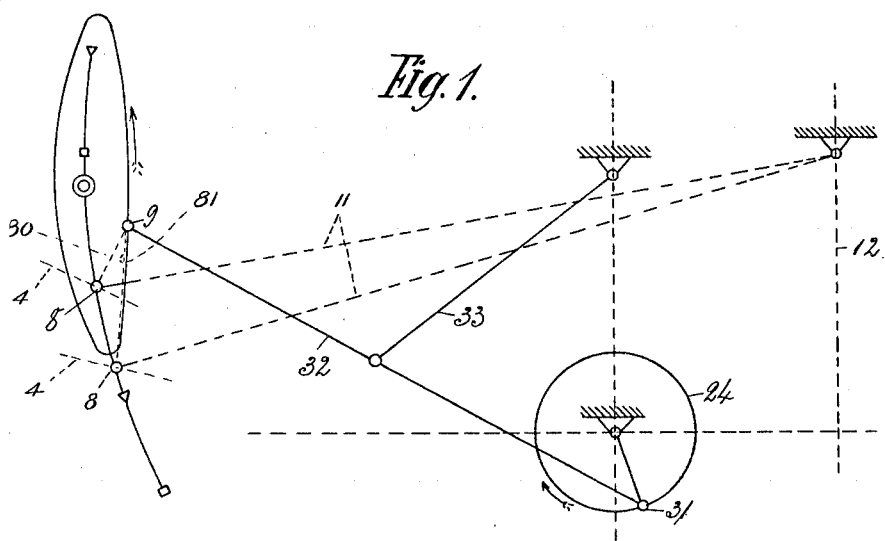

H. HASSENBACH.
CONTROLLING APPARATUS FOR WINGS, FINS, OR THE LIKE.
APPLICATION FILED NOV. 18, 1911.

1,116,273.

Patented Nov. 3, 1914.
6 SHEETS—SHEET 1.

Witnesses:
John C. Sanders
Albert F. Heuman

Inventor:
Hermann Hassenbach
BY
ATTY.

H. HASSENBACH.
CONTROLLING APPARATUS FOR WINGS, FINS, OR THE LIKE.
APPLICATION FILED NOV. 18, 1911.
1,116,273.
Patented Nov. 3, 1914.
6 SHEETS—SHEET 2.
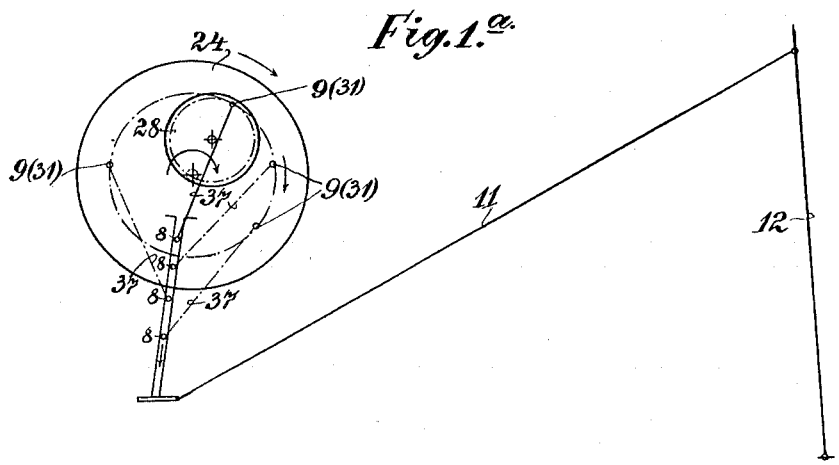
Fig. 1.ª
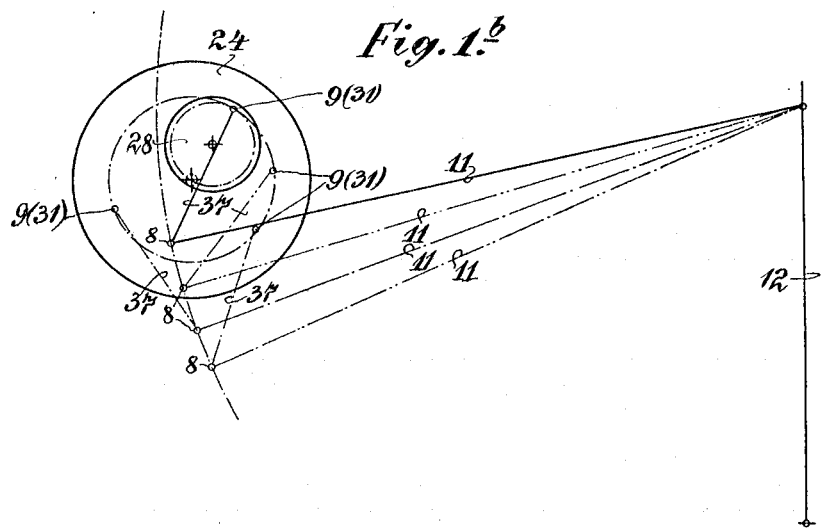
Fig. 1.ᵇ
Witnesses:
John C. Sanders
Albert F. Houman
Inventor:
Hermann Hassenbach
BY Wm Wallace White
ATTY

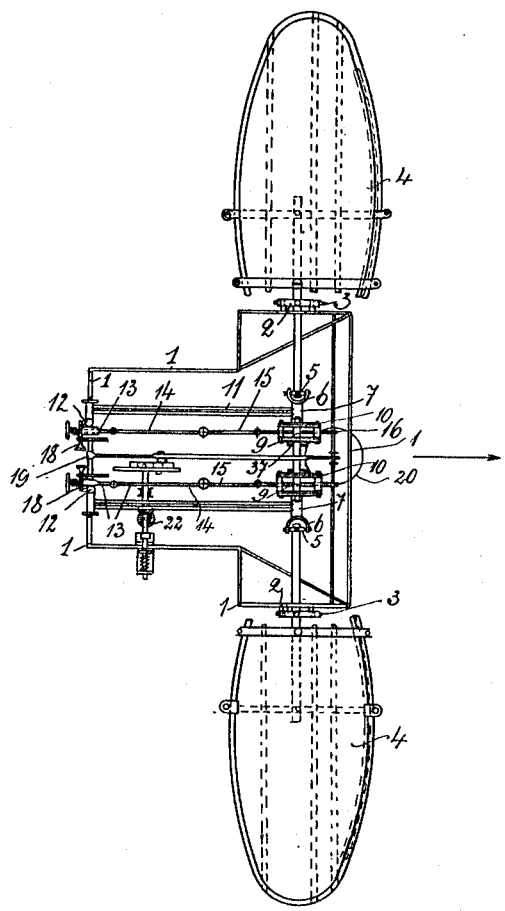

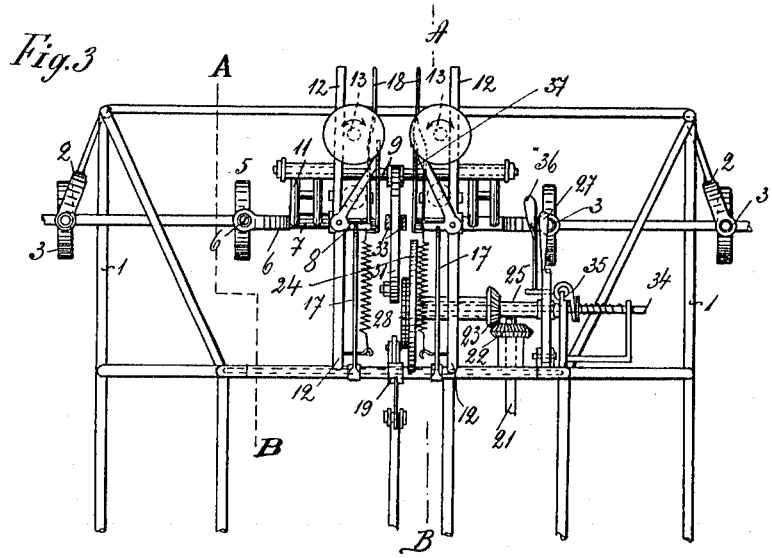

H. HASSENBACH.
CONTROLLING APPARATUS FOR WINGS, FINS, OR THE LIKE.
APPLICATION FILED NOV. 18, 1911.
1,116,273.
Patented Nov. 3, 1914.
6 SHEETS—SHEET 5.
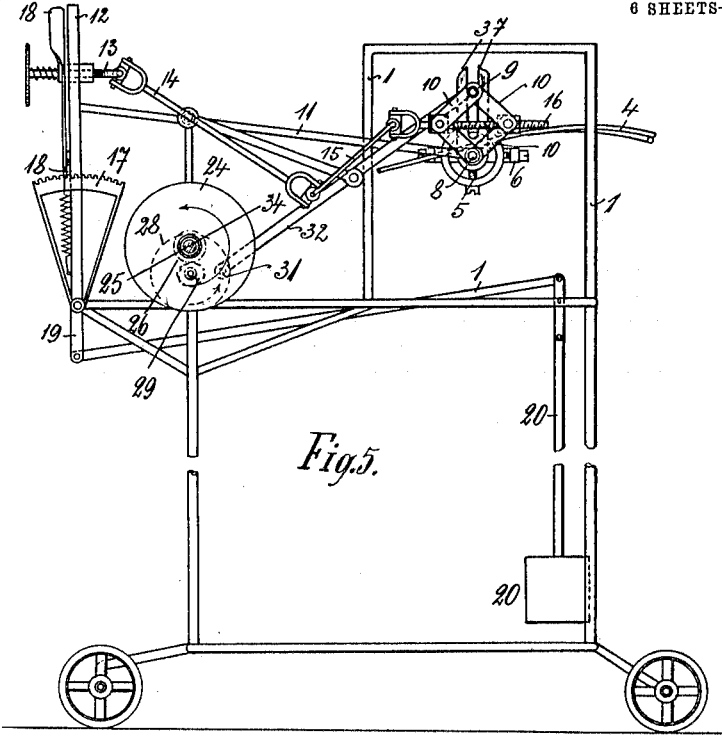
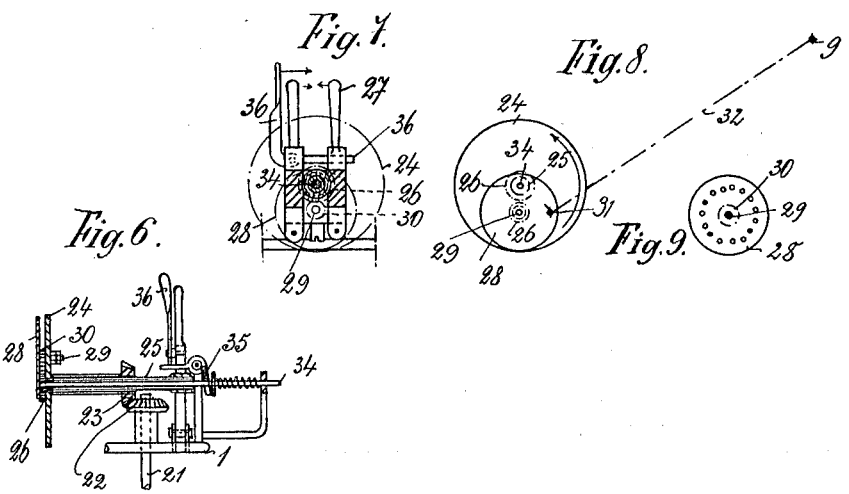
Witnesses:
John C. Sanders
Albert F. Heuman
Inventor:
Hermann Hassenbach
BY 
ATTY.
THE NORRIS PETERS CO., PHOTO-LITHO., WASHINGTON, D. C.

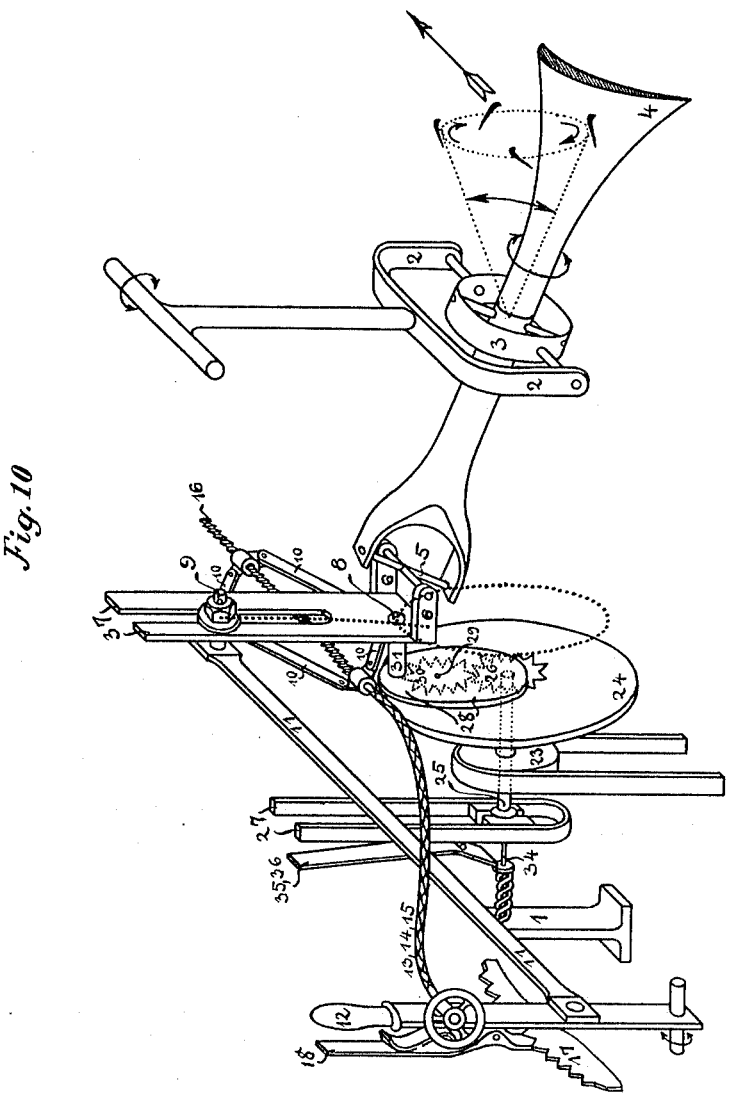

UNITED STATES PATENT OFFICE.

HERMANN HASSENBACH, OF DANZIG-LANGFUHR, GERMANY.

CONTROLLING APPARATUS FOR WINGS, FINS, OR THE LIKE.

1,116,273.  Specification of Letters Patent.  Patented Nov. 3, 1914.

Application filed November 18, 1911. Serial No. 660,974.

*To all whom it may concern:*

Be it known that I, HERMANN HASSENBACH, engineer, subject of Prussia, Germany, residing at 4 Birkenallee, Danzig-Langfuhr, Germany, have invented new and useful Improvements in Controlling Apparatus for Wings, Fins, or the like, of which the following is a specification.

The present invention relates to apparatus for operating the wings of aeroplanes or aerial craft, fins for submarine and other vessels or the like, which apparatus is of the kind adapted to cause these propulsive devices to perform such movements as are peculiar to the wings of a bird or the fins of a fish. It is known to provide wings which not only have a flapping or beating motion, but which have also a feathering motion in order to increase the efficiency and effectiveness of the beating or flapping motion, and to operate same by means of cranks, eccentrics and levers.

According to this invention, the mechanism for operating the wings comprises a crank arm secured to the inner end of the wing arm or stem, and while one end of the crank arm is moved to and fro along an unclosed path or line which may be either straight or curved the other end is caused to move around a closed curve which may be a circle, ellipse, an oval or a more complex curve as will appear. This constitutes the essential feature of the invention, a constructional example of which is shown in the drawings as applied to a flying machine.

Each of the wings is movably mounted in a sort of Cardan joint comprising fixed yoke parts. The inner ends of the arms of the wings are also connected by a Cardan joint with the crank arms aforesaid, which, in their turn, receive their complex motions from a linkage, a feature of which is that it can be adjusted and locked, so that the extent of movement of the wings can be regulated without the engine having to be stopped. This linkage may comprise a connecting rod which is rigidly connected to a shaft common to the crank arms and is pivotally suspended or connected at the center from or to the framework. The connecting rod is attached by its free end to the crank pin of a crank disk which is of such a nature that the axis of the crank pin can be shifted into the axis of the driving shaft of the crank disk, so that the wings, at any time, can even be brought to rest without having to interrupt the working of the engine.

A further feature is the provision of mechanism for varying the effective length of the crank arms for the purpose of varying the amplitude of the twist or warp of the wings giving the so-called feathering effect, such variation also being possible during flight.

Lastly, there is provided a mechanism for varying the effective direction of the wings during the operation thereof, and this mechanism may advantageously be placed under the control of a pendulum device which would act as a safety control for such mechanism.

In order to enable the invention to be understood, reference is made to the drawings in which:—

Figure 1 is a diagram illustrating the principle underlying the mechanism, the arrangement being one in which one end of the crank arm moves up and down over an arc and the other end moves in a closed curved path somewhat like a bent ellipse. Fig. 1ª is a simplified diagram of an arrangement according to which one end of the crank arm moves to and fro in a straight line while the other end moves in a circle. Fig. 1ᵇ shows one end moving to and fro over an arc and the other end moving in a circle. Fig. 2 is a plan view of a flying machine equipped with this improved mechanism on the principle illustrated in Fig. 1. Fig. 3 shows part of the flying machine in front elevation on a larger scale. Fig. 4 is a plan view of Fig. 3. Fig. 5 is a transverse section on the line A—B of Fig. 3, and Figs. 6, 7, 8 and 9 are views of details of a controlling mechanism for varying the amplitude of the beat of the wings. Fig. 10 is a perspective view of a modified construction of controlling mechanism illustrating the arrangement shown in Fig. 1ᵇ.

Referring first to the diagram Fig. 1, it will be seen that the free end 8 of the dotted lever 11, which swings about a fixed pivot, merely moves up and down, from the upper end to the lower end and vice versa of a curved line which is an arc of a circle. The free end 9 of the rod 32, which rod swings on the link 33 while being reciprocated by the revolving crank pin 31, moves in a closed curvilinear path which, in this particular instance, resembles an ellipse with the curve flattened on one side. Now supposing that the two ends 8 and 9 are connected together by what may be termed a crank arm represented by the dotted line 80 and supposing that a wing or plane 4 be connected perpendicularly with the crank arm 80, it will be readily understood that, if clockwise motion be given to the crank pin 31, the ends 8 and 9 will begin to rise each in its respective path. As the two paths at first diverge upwardly, however, the tilt of the plane 4 is increased, owing to the crank arm having to turn slightly in maintaining the connection between 8 and 9. Afterward the paths slightly converge and the tilt is reduced and then the point 9 goes over the top of its curve and begins to descend upon the other side of the path of the point 8, which latter commences its return along such path. It is clear therefore that the plane 4 will now be oppositely tilted to a degree which will not vary very much during the downstroke. Thus the essence of the invention will now be understood and it will be seen that the path which is traversed in both directions by the point 8 may either be a straight line or a curvilinear path, while the closed curve around which the point 9 moves may be circular, elliptical, oval, or any other desired regular or irregular curvilinear figure, for as long as one end of the crank arm 80 merely goes to and fro on its path reversing its motion at each end whereas the other end of the crank arm goes around its path and always moves along that path in the same direction, the conditions of the present invention are satisfied. For example, and as shown in Fig. 1ª, if the point 8 reciprocates up and down the guideway indicated by parallel lines, while the point 9 performs a circular motion, the crank arm 37 while rising and falling will also have the different angular positions seen in this figure and marked 9 (31). In this figure, in order to simplify matters, the points 9 and 31, Fig. 1, are merged into one instead of being connected by a rod, the link 33 being dispensed with as it is not necessary when a plain circular motion is employed. Fig. 1ᵇ shows the effect when the point 8 reciprocates to and fro along an arc, as in Fig. 1, but the point 9 travels in a circle as in Fig. 1ª. Referring again to Fig. 1, it will be seen that if the crank arm 80 could be lengthened at any moment say to the length represented by 81, the degree of tilt during any cycle of movements would be considerably different from what it was with the shorter arm.

The practical application of this mechanism to a flying machine will now be readily understood from the following description: On both sides of the framework 1 of the flying machine are arranged fixed yokes 2 in which Cardan-like rings 3 are pivotally mounted. The stems or arms of the wings 4 are supported by vertical pivots in these rings, and, the inner ends of the arms or stems of the wings are engaged by vertical pivots in the rings 5 of the inner Cardan joint, the yokes 6 of which are connected to the pins 8 of toggle arrangements hereinafter described. Each pin 8 is connected with the pin 9 by toggle links 10, the middle pivots of which are provided with nuts to enable screws 16 to be used for expanding or contracting the toggle arrangements for the purpose of increasing or decreasing the effective distances between the pins 8 and the pin 9, and thereby increasing or decreasing the effective crank arm for the purpose explained in reference to Fig. 1. Sleeves 7 turn on the pins 8 and are carried by rods 11, which are pivotally connected to levers 12 adapted to turn in the framework 1 and to be locked. On the levers 12 are mounted spindles 13, which are flexibly or universally jointed by the shaft parts 14, 15 connected together by Cardan joints with the screws 16. The shafts 14, 15 and Cardan joints may be replaced by flexible shafts or the like. The crank arms aforesaid are constituted by guide members 37 which are fixed on respective pins 8 and which receive and guide the respective ends of the pins 9. When either of the spindles 13 is turned by its hand wheel and the corresponding screw 16 expands or contracts its toggle, the corresponding pin 8 will be drawn up toward or lowered from the pin 9; the guide 37 moving over the latter as will be readily understood.

The levers 12 are held in position by toothed sectors 17 engaging the teeth of spring controlled levers 18 in the usual way; the locking tooth on a lever 18 having to be raised from the teeth of the sector before the lever can be moved in relation to the sector. While each of the levers turns independently on its pivot the two sectors 17 are connected together and turn about a common pivot, being fixedly connected to a lever 19 on the other side of the pivot, to which lever is connected the short arm of a double armed pendulum 20 hung in the framework 1. This pendulum 20 must be heavily weighted and may for this purpose be constituted by the carriage or framing for the reception of the driver of the flying machine and the motor for propelling it, the power being transmitted from the motor by suitable power transmitting devices which can be connected to the driving member of the mechanism in a simple manner. For example, the driving shaft 21 may be provided with a pinion wheel 22, which gears with the pinion wheel 23 on the hollow shaft of the crank disk 24, so that, when the motor is in operation, these parts always continue to rotate. Through this hollow shaft is passed a second hollow shaft 25, on which, in front of the crank disk 24, is mounted a gear wheel 26, and which is acted upon at its other end by a brake actuated by levers 27. Mounted upon the crank disk 24 so as to rotate eccentrically thereon is a disk 28; the disk 28 being carried by the pin 29 which is rotatably mounted in the crank disk 24 and has fixed on it a gear wheel 30, which meshes with the gear wheel 26. When the brake is applied to the shaft 25 the crank disk 24 continues to rotate and carries around the crank disk 28 eccentrically mounted thereon, and, as the wheel 30 will be then rolled around a fixed gear-wheel 26, the disk 28 will be revolved around its own axis so that a crank pin 31 on the disk 28 is moved nearer to or farther from the axis of the crank disk 24. The crank pin 31 on the disk 28 eventually shifts into the central axis of the crank disk 24 and, if the brake be taken off at this instant, any further rotation of the crank disk 28 on its pin 29 is rendered impossible. Thus the crank pin 31 will be left in a position in which it has no driving motion at all as its effective radius has been wiped out. By means of this shifting of the crank pin 31, which through the connecting rod 32 drives the pin 9 in the manner seen in Fig. 1 owing to the connecting rod 33 being pivotally suspended from or connected with the framework 1 by the link 33, the sweep of the wings is regulated, or the wings are brought to rest immediately the axis of the crank pin 31 coincides with the axis of the crank disk 24.

The crank disk 28 is normally held by a locking device adapted to be thrown out of operation when it is desired to adjust the position of the pin 31. In the present constructional example, the locking device is constituted by a spring controlled axially movable shaft 34 which is passed through the hollow shaft 25 and extends to the crank disk 28, the end of the shaft 34 entering any one of a series of holes formed in the disk 28 as seen in Figs. 6 and 9. By pulling a lever 36 toward the brake handles 27, a bell crank 35 is rocked and striking a collar on the shaft 34 retracts the latter from engagement with the disk 28. The lever 36 is preferably arranged in conjunction with the brake 27 in order to enable both mechanisms to be operated at one point and simultaneously. The end of the spring controlled shaft 34, which enters the holes or recesses in the disk 28, may conveniently be tapered, whereby the shaft easily enters one of the recesses in the crank disk 26 immediately the disengaging mechanism 36 is released. The brake 25 is employed for braking the hollow shaft 25 and may be used independently of the lever 36.

The wings 4 are preferably strengthened at the front and otherwise made elastic so as to resemble in this respect the wings of birds. In like manner, the underside of the wings may also be roughened or covered with scales to imitate real wings.

The action of the mechanism is as follows:—The engine being set in motion, the gears 22, 23 revolve the crank disk 24 and the adjustable crank pin 31 is carried around the axis of the disk 24 and reciprocates the rod 32. Owing to the linkage described with reference to Fig. 1, the pins 8 and 9, which are at a suitable distance apart determined by the adjustment of the screw 16, have the movement imparted to them described with reference to Fig. 1, and the arms 37 have the movements which can be ascertained by an inspection of the dotted arms 80 or 81 in Fig. 1. The result is that the pins 8, to which the arms 37 are fixed, have an up and down movement and also an oscillatory movement about their own axes, and, as the pins 8 are connected to respective wing stems through the Cardan joints 5, 6, it follows that such stems will be moved up and down over an arc and will also be subjected to a certain amount of turning which will produce a twist or turning of the wings as they perform their flapping or beating movements. The rings 3 would, in practice, be adapted for permitting this turning or twisting motion to take place.

Adjusting the degree of eccentricity of the pin 31 varies the amplitude of the beat of the wings, and adjusting the distance between the pins 8 and 9 varies the angle of twist. There is a third adjustment possible, however, for by shifting the levers 12 in one direction or the other about their pivots, the positions of the pins 8 relatively to the pin 9 are shifted, and, as will be readily understood by an inspection of Fig. 1, this results in what may be termed the tilt of the wings being varied.

Assuming that the apparatus is to rise, the independently adjustable levers 12 are shifted toward the front which results in a tilting of the wings, so that the under surfaces thereof are turned toward the front. If the twist of the wings is to be greater or less, the distance between the pins 8, 9 must be decreased or increased by adjusting the links 10 by means of the screws 16 and rods 13, 14 and 15 as described.

According to the amplitude desired for the sweep of the wings 4, the crank pin 31 must be shifted a greater or lesser distance from the central axis of the crank disk 24, and this can be accomplished while the engine is working and the wings are moving, the brake 27 being thrown into operation and the catch 34, 35, 36 out of operation until, by the turning of the crank disk 28 about its own axis, due to the gear wheel 30 rolling around the gear wheel 26 of the hollow shaft 25, the crank pin 31 has reached the distance from the central axis of the crank disk 24 which is necessary for the desired amplitude of the sweep of the wings. If the axis of the crank pin 31 be allowed to come into coincidence with the central axis of the crank disk 24 and to remain in this position, the wings will remain at rest notwithstanding that the engine and driving mechanisms continue to work, so that at such times the flapping of the wings ceases and the wings are used for gliding. The opposite transformation takes place as soon as the brake 27 is again operated, after releasing the catch 34 in the manner hereinbefore mentioned for the purpose of moving the crank pin away from the axis of the disk 24.

If the levers 12 be shifted simultaneously to the rear, the wings will assume the position for descent in a straight line. If a curve is to be described with the apparatus, the levers 12 are moved into different positions as required.

If the machine should suddenly make a dive, the pendulum bob or weight 20 will move, relatively, forward so that the connecting rod will be thrust backward and the sectors 17, with their respective levers 12 locked therein, will swing forward. Thus the levers 12 will be moved forward automatically for producing a lifting effect, just in the same way as if the levers 12 had been moved forward by hand.

In Fig. 10 the construction of the mechanism differs slightly from that shown in Figs. 2 to 9, but the operation is substantially similar thereto. The connecting rod 32 and the link 33 are dispensed with; the pin 31 of the disk 28 being made in one with the pivot 9 which is therefore caused to move in a circle, while the pin 8 reciprocates in an arc. A belt and pulley drive 23 is employed instead of bevel wheel, a flexible shaft 13, 14, 15 in lieu of the rods and Cardan joints, and a bent lever 35, 36 is substituted in place of the two levers hereinbefore described.

I claim:—

1. Actuating mechanism for the wings of aerial craft or the like, comprising a crank arm, a wing rigidly attached to said arm, and means for reciprocating one end of said arm in an unclosed path and for moving the other end in a closed curve; motion similar to that of a bird being thereby imparted to the wings.

2. Actuating mechanism for the wings of aerial craft or the like, comprising a crank arm, a wing rigidly attached to said arm, and means for reciprocating one end of said arm in an arc and for moving the other end in a closed curve; motion similar to that of a bird being thereby imparted to the wings.

3. In actuating mechanism for the wings of aerial craft or the like, means for regulating the twist or warp of the wings, comprising toggle links (10) adapted to act as crank arms, and a screw (16) adapted to traverse said toggle links and to vary their effective length.

4. In actuating mechanism for the wings of aerial craft or the like, means for varying the effective length of the crank arms, comprising toggle links (10) adapted to act as crank arms, a flexible shaft, and a screw (16) actuated by the rotation of said flexible shaft, and adapted to traverse said links and vary their effective length.

5. In actuating mechanism for the wings of aerial craft or the like, means for varying the effective length of the crank arms comprising toggle links (10) adapted to act as crank arms; connecting rods (14, 15) attached to one another by means of Cardan or universal joints, and a screw (16) actuated by the rotation of said connecting rods and adapted to traverse said links and vary their effective length.

6. In actuating mechanism for the wings of aerial craft, a crank arm comprising toggle links (10), a pin joining the upper ends of said links, a screw (16) adapted to traverse said links and to expand or contract same, and a slotted guide member (37) fixed to one end of the toggle links and adapted to receive and guide said pin.

7. In actuating mechanism for the wings of aerial craft or the like, means for regulating the extent of movement of the wings, comprising crank arms (10), an eccentrically mounted rotary disk (28), and a connecting rod (32) rigidly attached at one end to said crank arms (10) and at its other end to said eccentrically mounted disk (28).

8. In actuating mechanism for the wings of aerial craft, means for varying the effective direction or tilt of one or both of the wings either conjointly or independently, comprising a wing arm consisting of a crank arrangement (10), an operating lever (12) adapted to control one wing; and a connecting rod (11) for transmitting the movements of said lever to said crank arrangement (10).

9. In actuating mechanism for the wings of aerial craft, the herein described system of levers, comprising a connecting rod (11) pivotally attached to one end of a crank arm (10), a vibratory link (33), a second connecting rod (32) fulcrumed to said link and pivotally attached to the other end of the crank arm and to an eccentric crank pin (31).

10. In actuating mechanism for the wings of aerial craft, the combination with driving cranks, crank pins on said driving cranks and arms adapted to carry the wings, of a system of connecting rods and levers attached to said wing arms and to said crank pins, and means for varying the relative position of the crank pins of said driving cranks.

11. In actuating mechanism for the wings of aerial craft, means for regulating the action of the driving cranks, comprising a crank-disk (24), a second disk mounted eccentrically thereon (28), a pin (31) mounted eccentrically on said second disk, and means for causing said pin to be brought into and out of alinement with the axis of the crank disk.

12. In actuating mechanism for the wings of aerial craft or the like, a driven crank disk (24), a second crank disk (28) eccentrically mounted thereon, a crank pin (31) carried by said crank disk, and a brake device (27) for fixing the position of the crank pin (31) in relation to the axis of the crank disk (24).

13. In actuating mechanism for the wings of aerial craft or the like, a driven crank disk (24), a second crank disk (28) eccentrically mounted thereon, a crank pin (31) carried by said crank disk, a gear wheel (30) rotating between the crank disks for revolving said disk (28) around its own axis, and a brake device (27) for fixing the position of the crank pin (31) in relation to the axis of the crank disk (24).

14. In actuating mechanism for the wings of aerial craft or the like, a driven crank disk (24) a second crank disk (28) eccentrically mounted thereon, a crank pin (31) carried by said crank disk, a gear wheel (26), a second gear wheel (30) in mesh with gear wheel (26) for rotating said crank disk (28) around its own axis, and a brake device (27) for fixing the position of the crank pin (31) in relation to the axis of the crank disk (24).

15. In actuating mechanism for the wings of aerial craft, the combination with means for varying the position of a pin (31) eccentrically mounted on a disk (28) which in turn is eccentrically mounted on a crank disk (24), of means for normally locking disk (28) in various positions.

16. In actuating mechanism for the wings of aerial craft, means for locking the disk (28) in certain positions comprising a spring controlled axially movable shaft (34) adapted to engage in recesses or holes formed in the said disk.

17. In actuating mechanism for the wings of aerial craft, means for unlocking the disk (28); comprising a bell-crank lever (35) adapted to engage with a collar on the locking shaft (34), and a lever (36) adapted to cause the said bell-crank to move the shaft (34) out of engagement with the disk (28).

In testimony whereof I have signed my name to this specification in the presence of two subscribing witnesses.

HERMANN HASSENBACH.

Witnesses:
ROBERT PETSCHOW,
ERNST SPUNUSKI.

Copies of this patent may be obtained for five cents each, by addressing the "Commissioner of Patents, Washington, D. C."